United States Patent
Bassler et al.

(10) Patent No.: US 8,979,501 B2
(45) Date of Patent: Mar. 17, 2015

(54) CONNECTION OF A SHAFT TO A ROTATING COMPONENT

(75) Inventors: Juergen Bassler, Achern (DE); Rudolf Reinhardt, Esslingen (DE); Heiko Steinmetz, Ohmden (DE)

(73) Assignee: Daimler AG, Stuttgart (DE)

( * ) Notice: Subject to any disclaimer, the term of this patent is extended or adjusted under 35 U.S.C. 154(b) by 1106 days.

(21) Appl. No.: 12/867,474

(22) PCT Filed: Dec. 12, 2008

(86) PCT No.: PCT/EP2008/010569
§ 371 (c)(1),
(2), (4) Date: Dec. 1, 2010

(87) PCT Pub. No.: WO2009/100749
PCT Pub. Date: Aug. 20, 2009

(65) Prior Publication Data
US 2011/0064581 A1     Mar. 17, 2011

(30) Foreign Application Priority Data
Feb. 13, 2008 (DE) .......................... 10 2008 008 857

(51) Int. Cl.
*F04D 29/20* (2006.01)
*F16D 1/068* (2006.01)
*F01D 5/02* (2006.01)
(Continued)

(52) U.S. Cl.
CPC ............... *F16D 1/068* (2013.01); *F01D 5/025* (2013.01); *F04D 29/023* (2013.01); *F04D 29/266* (2013.01); *F16D 1/072* (2013.01); *F05D 2260/36* (2013.01); *F05D 2260/37* (2013.01); *F05D 2220/40* (2013.01)

USPC ............... 416/244 A; 416/213 R; 416/241 R; 416/241 B; 29/509; 29/525.14; 403/29; 403/30; 403/271; 403/274

(58) Field of Classification Search
USPC ............ 415/216.1, 217.1; 416/213 R, 213 A, 416/244 R, 244 A, 241 R, 241 B; 464/182; 29/509, 525.14; 403/28–30, 274, 403/270–272
See application file for complete search history.

(56) References Cited

U.S. PATENT DOCUMENTS

| 4,704,075 A | 11/1987 | Johnston et al. |
| 4,747,722 A | 5/1988 | Kawaguchi et al. |

(Continued)

FOREIGN PATENT DOCUMENTS

| DE | 42 05 248 A1 | 8/1993 |
| EP | 0 365 253 A1 | 4/1990 |

(Continued)

OTHER PUBLICATIONS

Japanese Office Action with English translation dated Oct. 24, 2012 (five (5) pages).
International Search Report with partial English translation dated Mar. 19, 2009 (eight (8) pages).
PCT/ISA/237 (Six (6) pages), dated Mar. 19, 2009.
Japanese Office Action dated Aug. 20, 2013 (three (3) pages).

*Primary Examiner* — Christopher Verdier
(74) *Attorney, Agent, or Firm* — Crowell & Moring LLP

(57) ABSTRACT

For connecting a shaft to a rotating component, especially of a shaft to a turbine wheel of an exhaust gas turbocharger, an intermediate component is provided by means of which the shaft is connected indirectly to the rotating component. The connection between the rotating component and the intermediate component is a form-locking and/or force-locking connection, especially a riveted connection.

4 Claims, 1 Drawing Sheet

(51) Int. Cl.
  *F04D 29/02* (2006.01)
  *F04D 29/26* (2006.01)
  *F16D 1/072* (2006.01)

(56) References Cited

U.S. PATENT DOCUMENTS

| | | | |
|---|---|---|---|
| 4,983,064 A | | 1/1991 | Kawaguchi et al. |
| 5,089,312 A | * | 2/1992 | Kawase et al. ............ 416/244 A |
| 5,585,163 A | | 12/1996 | Yoshikawa et al. |
| 2006/0021221 A1 | | 2/2006 | Decker |
| 2006/0067824 A1 | | 3/2006 | O'Hara |
| 2007/0199977 A1 | | 8/2007 | Pollard et al. |
| 2009/0050675 A1 | | 2/2009 | Baur et al. |

FOREIGN PATENT DOCUMENTS

| | | |
|---|---|---|
| FR | 2 574 783 A1 | 6/1986 |
| JP | 59-170602 U | 11/1984 |
| JP | 62-178729 A | 8/1987 |
| JP | 64-46402 U | 3/1989 |
| JP | 2003-97213 A | 4/2003 |
| JP | 2006-37952 A | 2/2006 |
| JP | 2006-105144 A | 4/2006 |
| JP | 2008-534288 A | 8/2008 |

* cited by examiner

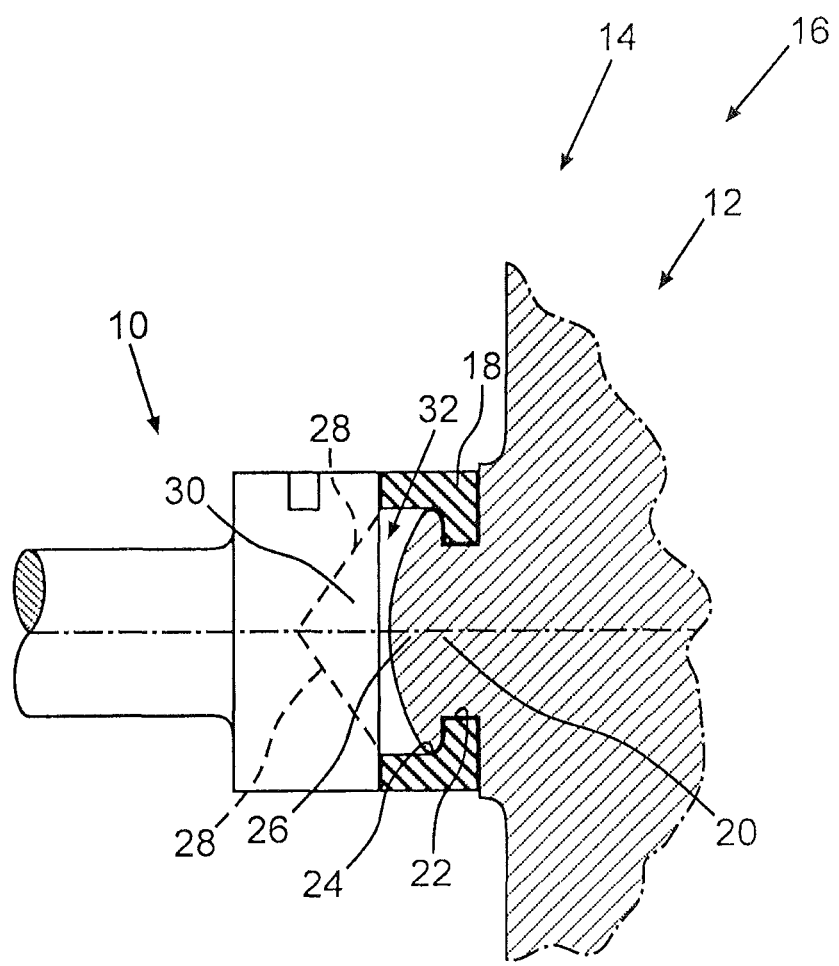

CONNECTION OF A SHAFT TO A ROTATING COMPONENT

BACKGROUND AND SUMMARY OF THE INVENTION

This application is a national stage of PCT International Application No. PCT/EP2008/010569, filed Dec. 12, 2008, which claims priority under 35 U.S.C. §119 to German Patent Application No. 10 2008 008 857.9, filed Feb. 13, 2008, the entire disclosure of which is herein expressly incorporated by reference.

The invention relates to an apparatus for connecting a shaft to a rotating component, especially a shaft to a turbine wheel of an exhaust gas turbocharger, and to a method for producing such a connection.

Such connections are conventionally produced with a welded or soldered connection with turbines on the exhaust gas side in an exhaust gas turbocharger. It is however problematic that the pairing of the two materials of the shaft or of the turbine wheel have to be adapted to each other in such a manner that a favorable connection between the shaft and the turbine wheel results, in terms of quality. A conflict of goals often results if the turbine wheel has to be manufactured of a correspondingly thermally resistant material on the one hand, while the shaft itself can be manufactured of a conventional and more cost-efficient material in comparison.

It is therefore one object of the present invention to provide a connection (and a method of the type mentioned above) by which the shaft and the rotating component—in particular the turbine wheel—can be connected in an especially advantageous manner.

This and other objects and advantages are achieved by the connection and the method according to the invention for producing such a connection especially for a turbine wheel of an exhaust gas turbocharger, in which an intermediate component is provided, by which the shaft is indirectly connected to the rotating component (turbine wheel). It is thereby provided that the intermediate component and the rotating component are connected by means of a form-locking and/or force-locking connection, especially a riveted connection. In other words, it is provided according to the invention, not to connect the shaft directly to the rotating component—especially the turbine wheel—, but rather by interposition of an intermediate component, wherein the intermediate component and the rotating component are connected in a form-locking and/or force-locking manner. It is for example possible hereby to form the intermediate component in such a manner or to use such a material for this, that it can be connected very well to the rotating component—especially to the turbine wheel—on the one hand, and on the other hand very well to the shaft.

As connections with partners to be connected, as for example titanium aluminum (TiAL) to steel, can only be welded or soldered in an extremely difficult manner or not at all, such a form-locking connection is particularly suitable to fasten the parts to each other correspondingly. In a further arrangement, it has thereby been shown to be particularly advantageous if the rivet for connecting the intermediate component to the rotating component (turbine wheel) is formed as a stump of the rotating component, which is then formed, for example by means of a suitable die, to a rivet which holds the intermediate component at the rotating component in a form-locking manner. It would likewise also be conceivable to define a rivet by means of rotational welding or the like in the rotating component or turbine wheel, if the material permits.

In a particularly advantageous arrangement of the invention, the intermediate component consists of a heat-resistant and weldable material, in particular of an alloy based on nickel, so that the intermediate component can be connected to the turbine wheel which is hot during operation. So that the turbine wheel itself resists the thermal stresses, it can in particular be manufactured of a heat-resistant or highly heat-resistant material. Titanium aluminum (TiAl) is particularly suitable for this purpose.

The intermediate component is preferably connected to the shaft by means of a welded connection, in particular by friction welding or EB (electron beam) welding in a further embodiment of the invention. Especially with one—with regard to the diameter of the components to be connected—radial outward welded connection, a particularly favorable heating results by the friction welding, so that the intermediate component is connected to the shaft in a particularly reliable manner.

Material pairs and constructive embodiments for the turbine wheel and constructive embodiments, with which the rigidity of the connection during the heating by a possibly different heat expansion increases or at least is not reduced, are particularly advantageous.

The advantages described previously in connection with the connection described above are also valid in the same manner for the method according to the invention. This is further distinguished in that the intermediate component is first connected to the rotating component (turbine wheel) by means of the form-locking connection, in particular the riveted connection. The connection technology of heat riveting is particularly suitably for this purpose. In the second method step of the invention of the presently described version of method, the intermediate piece is then correspondingly welded to the shaft, in order to realize the indirect connection of the rotating component (turbine wheel) with the shaft.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic, partially sectional side view of the connection of a shaft to a rotating component of an exhaust gas turbocharger designed as a turbine wheel, wherein the turbine wheel shown in a sectional manner is indirectly connected to the shaft, not shown in a sectional manner, by means of an intermediate component shown in a sectional manner, and wherein a form-locking connection in the form of a riveted connection is realized between the intermediate component and the turbine wheel, and a welded connection between the intermediate component and the shaft.

DETAILED DESCRIPTION OF THE DRAWINGS

In the FIGURE is shown an end of a shaft 10 in a sectional side view, which faces a rotating component in the form of a turbine wheel 12. The shaft 10 and the turbine wheel 12 are thereby part of a turbine 14 of an exhaust gas turbocharger 16.

The material choice of the individual components 10, 12 thereby takes place according to its thermal exposure. The turbine wheel 12 or the rotor presently consist of titanium aluminum (TiAl), which is correspondingly highly rigid, heat-resistant and tight in the intermetallic phase. TiAl further has the advantage to be especially favorable with regard to weight.

The shaft 10 presently consists of a cost-efficient steel conventional for turbocharger shafts, in the present case a heat-treated steel (42CrMo4). This heat-treated steel can correspondingly be welded in a favorable manner. In addition to the heat-treated steel shown here, other materials are also conceivable for the shaft 10, for example an Inconel® shaft suitable for series production. (Inconel® is a registered trademark of Special Metals Corporation.)

The connection of the shaft 10 and the turbine wheel 12 does not take place directly in the present case, but indirectly, namely by interposition of an intermediate component 18. The intermediate component 18 is shown in a sectional manner in the FIGURE as is the turbine wheel 12.

As the intermediate piece 18 contacts the hot rotor or turbine wheel 12 on the one hand, it must be made of a correspondingly heat-resistant material, for example of an alloy based on nickel (Inconel®). This material not only has the property of being particularly heat-resistant, but can also be welded in a correspondingly advantageous manner.

It can now be seen in the FIGURE that the turbine wheel 12 is connected to the intermediate component 18 by a form-locking connection—in the present case a riveted connection. The turbine wheel 12 comprises a stump 20 correspondingly projecting in the direction of the intermediate component 18 or of the shaft 10, which is formed integrally with the remaining turbine wheel 12 and is conveniently heated in a conductive manner to a forging temperature, in order to be riveted with the intermediate component 18 with a suitable die. The intermediate component 18 thereby comprises an enlarged recess 24 in addition to a through-opening 22, so that the through-opening 22 and the recess 24 result in the T-shape shown in section in the FIGURE. A top 26 of the stump 20 formed as a rivet thereby lies within the recess 24, in order to realize the form-locking connection between the turbine wheel 12 and the intermediate component 18. In addition to the conductive heating provided in this embodiment, an inductive or another convenient heating can alternatively also be envisaged.

In addition to the pure form-locking connection between the intermediate component 18 and the rotating component 12 achieved by the riveted connection, a force-locking is also achieved between these components by means of the riveted connection. This results from the shrinking and extending of the two materials of the participating components, which respectively have different heat expansions.

By means of the previously described form-locking connection, in particular a riveted connection, it is taken into account that titanium aluminum (TiAl) can be welded in only a relatively poor manner and that large tensions would result in the weld seam due to the highly different heat expansion coefficients between TiAl and steel. Titanium aluminum (TiAl) is on the other hand particularly suitable as turbine wheel material for dynamically strained turbine wheels due to its low density and its relatively high heat resistance. The low density enables a faster acceleration and thus a faster charging pressure build-up.

It can further be seen in the FIGURE that the intermediate component 18 is connected to the shaft 10 via a welded connection, especially by friction welding or electron beam welding (EB welding). This is possible as the intermediate component 18 (Inconel®) and the shaft (heat-treated steel 42CrMo4) consist of correspondingly weldable materials. The intermediate component 18 and the shaft 10 are thereby designed in such a manner that they are connected to each other only in the region of their outer circumference. A particularly favorable friction welding can for example be realized by this, as the rotational speeds can be adjusted correspondingly large at the outer circumference.

It is further indicated with dashed lines 28 that a corresponding recess 30 is introduced into the shaft 10 on the face side. This forms a hollow chamber 32 with the chamber of the recess 24, which is not taken up by the top 26 of the stump 20, which hollow chamber serves as a heat throttle to the bearing. It is thus achieved in particular that a low heat entry into the shaft 10 takes place via the turbine wheel 12 or the intermediate component 18.

The stump 20 and the through-passage 22 can correspondingly be adjusted to each other in their form. It would for example be conceivable to provide them with a circular cross section. The respective cross section can likewise also be formed in an angular manner as a polygon, in order to achieve a better torque transfer between the turbine wheel 12 and the intermediate component 18. This is possible in a technically unproblematic manner, as the turbine wheel 12 is produced in a cast-technological manner and that the intermediate component can for example be forged.

It can thus be seen altogether that an indirect connection of the shaft 10 and of the turbine wheel 12 is created by the intermediate component 18, so that for example, the material titanium aluminum (TiAl) can be used for the turbine wheel 12. A further advantage is the generation of the hollow chamber 32 as a heat throttle. When the intermediate component 18 is used, an optimum material mix is thereby possible, wherein tensions of the connection can be avoided by the chosen connection methods. Additionally, an extremely cost-efficient connection of the highly heat-resistant turbine wheel 12 results with a more favorable shaft 10. It is a further advantage that a tension-critical direct connection of the turbine wheel 12 consisting of titanium aluminum (TiAl) is avoided.

With the present method for producing the connection, it has been shown to be particularly advantageous to rivet the turbine wheel 12 with the intermediate component 18 in the first step. The stump 20 is thereby for example initially heated to the forging temperature and then deformed by means of a suitable die. In the next step, the intermediate component 18 is then connected to the shaft 10 by means of a suitable welding method.

In addition to the connection of the intermediate component 18 to the shaft 10 by means of an electron beam welding method shown above, another beam welding method, for example laser welding, is also suitable for the connection. Alternatively, it is also possible to connect the intermediate component 18 and the shaft by a soldering method.

The invention claimed is:

1. A rotating apparatus comprising:
   a turbine wheel of an exhaust gas turbocharger, wherein the turbine wheel comprises a rivet on one end; and
   a shaft made of heat treated steel, wherein an end of the shaft facing the turbine wheel includes a recess;
   an intermediate component having a through opening and a recess,
   wherein the intermediate component is fixedly connected to the turbine wheel by a form-locking or force-locking riveted connection formed by the rivet of the turbine wheel passing through the through opening and engaging in the recess of the intermediate component, and
   wherein a periphery of the intermediate component is welded to a periphery of the shaft so that the recess of the shaft is aligned with the recess of the intermediate component.

2. The rotating apparatus of claim 1, wherein the intermediate component is made of a nickel alloy and the turbine wheel is made of TiAl.

3. A method of producing a rotating apparatus comprising:
fixedly connecting an intermediate component to a turbine wheel of an exhaust gas turbocharger by a form-locking or force-locking riveted connection, wherein the turbine wheel comprises a rivet on one end, wherein the intermediate component has a through opening and a recess, and wherein the riveted connection is formed by the rivet of the turbine wheel passing through the through opening and engaging in the recess of the intermediate component, and
welding a periphery of the intermediate component to a periphery of a shaft made of heat treated steel and having a recess in an end facing the turbine wheel, wherein the recess of the shaft is aligned with the recess of the intermediate component.

4. The method of claim 3, wherein the intermediate component is made of a nickel alloy and the turbine wheel is made of TiAl.

\* \* \* \* \*